US008869231B2

(12) United States Patent
Ito

(10) Patent No.: US 8,869,231 B2
(45) Date of Patent: Oct. 21, 2014

(54) INFORMATION PROCESSING UNIT FOR ACQUIRING TELEVISION PROGRAM-RELATED INFORMATION

(75) Inventor: Yumi Ito, Tokyo (JP)

(73) Assignee: Sony Corporation (JP)

( * ) Notice: Subject to any disclaimer, the term of this patent is extended or adjusted under 35 U.S.C. 154(b) by 457 days.

(21) Appl. No.: 12/455,507

(22) Filed: Jun. 3, 2009

(65) Prior Publication Data

US 2010/0011395 A1    Jan. 14, 2010

(30) Foreign Application Priority Data

Jun. 13, 2008 (JP) .............................. P2008-154994

(51) Int. Cl.
*H04N 7/173* (2011.01)
*G06F 17/30* (2006.01)
*H04N 21/434* (2011.01)
*H04N 21/462* (2011.01)
*H04N 21/239* (2011.01)
*H04N 21/81* (2011.01)
*H04N 21/4722* (2011.01)

(52) U.S. Cl.
CPC ........ *G06F 17/3002* (2013.01); *H04N 21/4345* (2013.01); *H04N 21/4622* (2013.01); *H04N 21/2393* (2013.01); *H04N 7/17318* (2013.01); *H04N 21/8133* (2013.01); *H04N 21/4722* (2013.01)
USPC ............................ 725/136; 725/110; 725/116

(58) Field of Classification Search
None
See application file for complete search history.

(56) References Cited

U.S. PATENT DOCUMENTS

| 2003/0051252 | A1 | 3/2003 | Miyaoku et al. | |
| 2004/0158874 | A1* | 8/2004 | Ono et al. | 725/131 |
| 2004/0268389 | A1* | 12/2004 | Sezan et al. | 725/35 |
| 2006/0095543 | A1 | 5/2006 | Ito et al. | |
| 2006/0250650 | A1* | 11/2006 | Narahara et al. | 358/1.18 |
| 2007/0101375 | A1* | 5/2007 | Haberman | 725/86 |
| 2007/0124796 | A1* | 5/2007 | Wittkotter | 725/136 |
| 2007/0250848 | A1* | 10/2007 | Gorti et al. | 725/14 |
| 2008/0016529 | A1 | 1/2008 | Kitagawa | |

(Continued)

FOREIGN PATENT DOCUMENTS

| JP | 2001309349 A | 11/2001 |
| JP | 2002-209204 A | 7/2002 |
| JP | 2003158726 A | 5/2003 |
| JP | 2006060426 A | 3/2006 |

OTHER PUBLICATIONS

European Search Report, EP 09162496, dated Mar. 2, 2010.

*Primary Examiner* — Chris Parry
(74) *Attorney, Agent, or Firm* — Lerner, David, Littenberg, Krumholz & Mentlik, LLP

(57) ABSTRACT

An information processing unit includes: a receiving unit which receives, via a communication network, first specifying information which is used by a content source to specify the content, from a display device which receives and displays broadcast content; a converting unit which, upon retrieval request from the display device for related information which is related to the content, converts the first specifying information into second specifying information, which is used by a source of the related information to specify the content; a retrieval controlling unit which transmits the second specifying information to a retrieval device, which retrieves the related information based on the second specifying information, via the communication network and controls retrieval of the related information; and a providing unit which provides the display device with the related information acquired from the retrieval device via the communication network upon retrieval request for the related information to the retrieval device.

4 Claims, 4 Drawing Sheets

(56) References Cited

U.S. PATENT DOCUMENTS

2008/0040768 A1 2/2008 Robotham
2008/0066100 A1 3/2008 Brodersen et al.
2009/0276807 A1* 11/2009 Robotham .................. 725/40

* cited by examiner

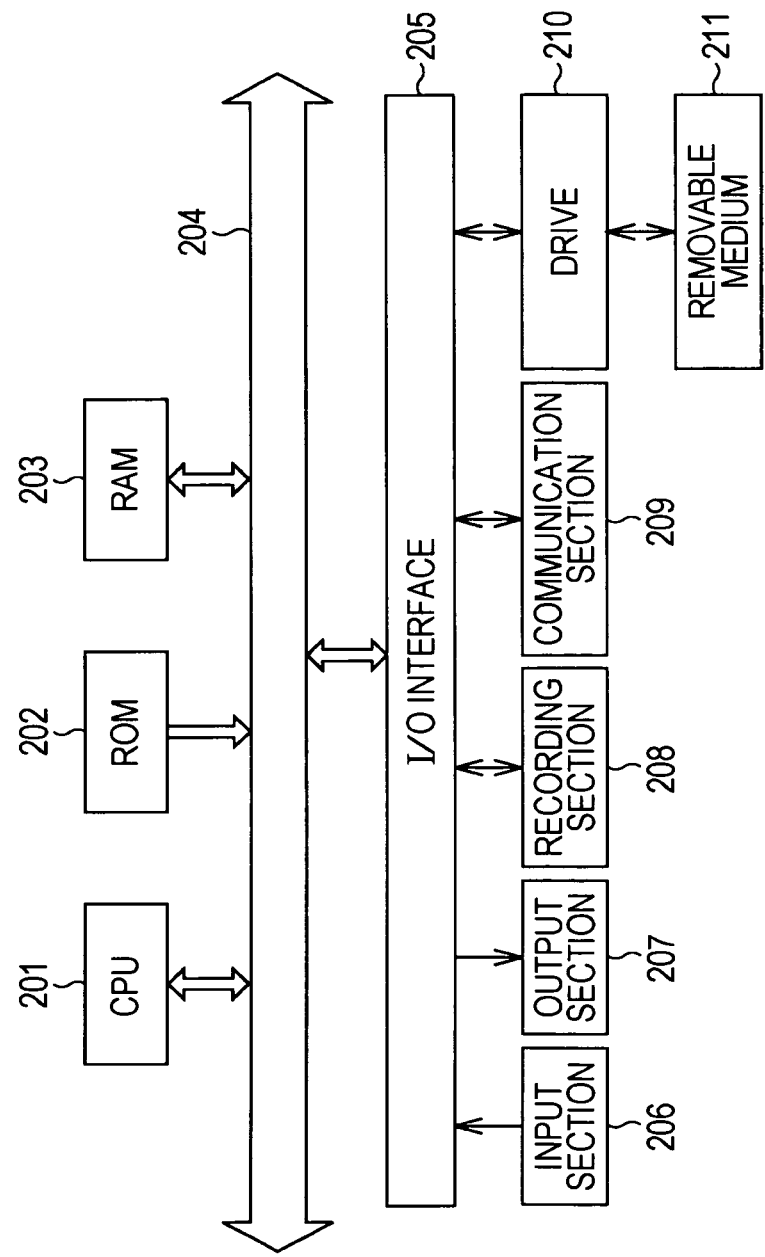

INFORMATION PROCESSING UNIT FOR ACQUIRING TELEVISION PROGRAM-RELATED INFORMATION

The present application claims priority from Japanese Patent Application No. JP 2008-154994 filed in the Japanese Patent Office on Jun. 13, 2008, the entire content of which is incorporated herein by reference.

BACKGROUND OF THE INVENTION

1. Field of the Invention

The present invention relates to an information processing unit, and more particularly, to an information processing unit that is configured to acquire television program-related information.

2. Description of the Related Art

It has been known that the related art display devices, such as television receivers, configured to receive video data of television broadcast programs may also receive the service information ("SI") and the electric program guide ("EPG") along with the video data. The SI includes information about the television program being broadcast, such as title and casting.

Information included in the SI displayed on the display device therefore provides a viewer with certain information about the television program he or she is watching.

SUMMARY OF THE INVENTION

When interested in a television program, a viewer may wish to find information about the television program (hereinafter, referred to as "related information"). The related information may include information about other television programs or digital versatile discs (DVDs) of the same performer.

If the display device obtains the related information via the Internet directly using the SI received from a broadcasting station, the viewer may find a greater amount of information related to the television program he or she is watching.

It has, however, not yet been possible to obtain the related information via the Internet by directly using the SI. Accordingly, the viewer may not easily obtain the television program-related information other than the SI.

The invention has been made in view of the above circumstances, and an object thereof is to acquire television program-related information without directly using the SI.

An information processing unit according to an embodiment of the invention includes: a receiving unit which receives, via a communication network, first specifying information from a display device which receives and displays content being broadcast, the first specifying information being used by a source of content to specify the content; a converting unit which, upon request for retrieval of related information from the display device, converts the first specifying information into second specifying information, the second specifying information being used by a source of the related information to specify the content and the related information being related to the content; a retrieval controlling unit which transmits the second specifying information to a retrieval device via the communication network and controls retrieval of the related information, the retrieval device retrieving the related information based on the second specifying information; and a providing unit which provides the display device with the related information acquired from the retrieval device via the communication network in response to the request for retrieval of the related information to the retrieval device.

According to one embodiment of the invention, the first specifying information is received, via the communication network, from the display device that receives and displays the content being broadcast. The content source specifies the content by the first specifying information. When retrieval of the related information, which is the information related to the content, is requested by the display device, the first specifying information is converted into the second specifying information. The source of the related information specifies the content by the second specifying information. The second specifying information is transmitted to the retrieval device via the communication network and retrieval of the related information is controlled. The retrieval device retrieves the related information based on the second specifying information. The display device is provided, via the communication network, with the related information retrieved from the retrieval device in response to the retrieval request of the related information with respect to the retrieval device.

According to one embodiment of the invention, the television program-related information may be acquired. More particularly, according to one embodiment of the invention, the television program-related information may be acquired without directly using the SI.

BRIEF DESCRIPTION OF THE DRAWINGS

FIG. 4 illustrates an exemplary configuration of a computer.

DESCRIPTION OF THE PREFERRED EMBODIMENTS

Figure 1:
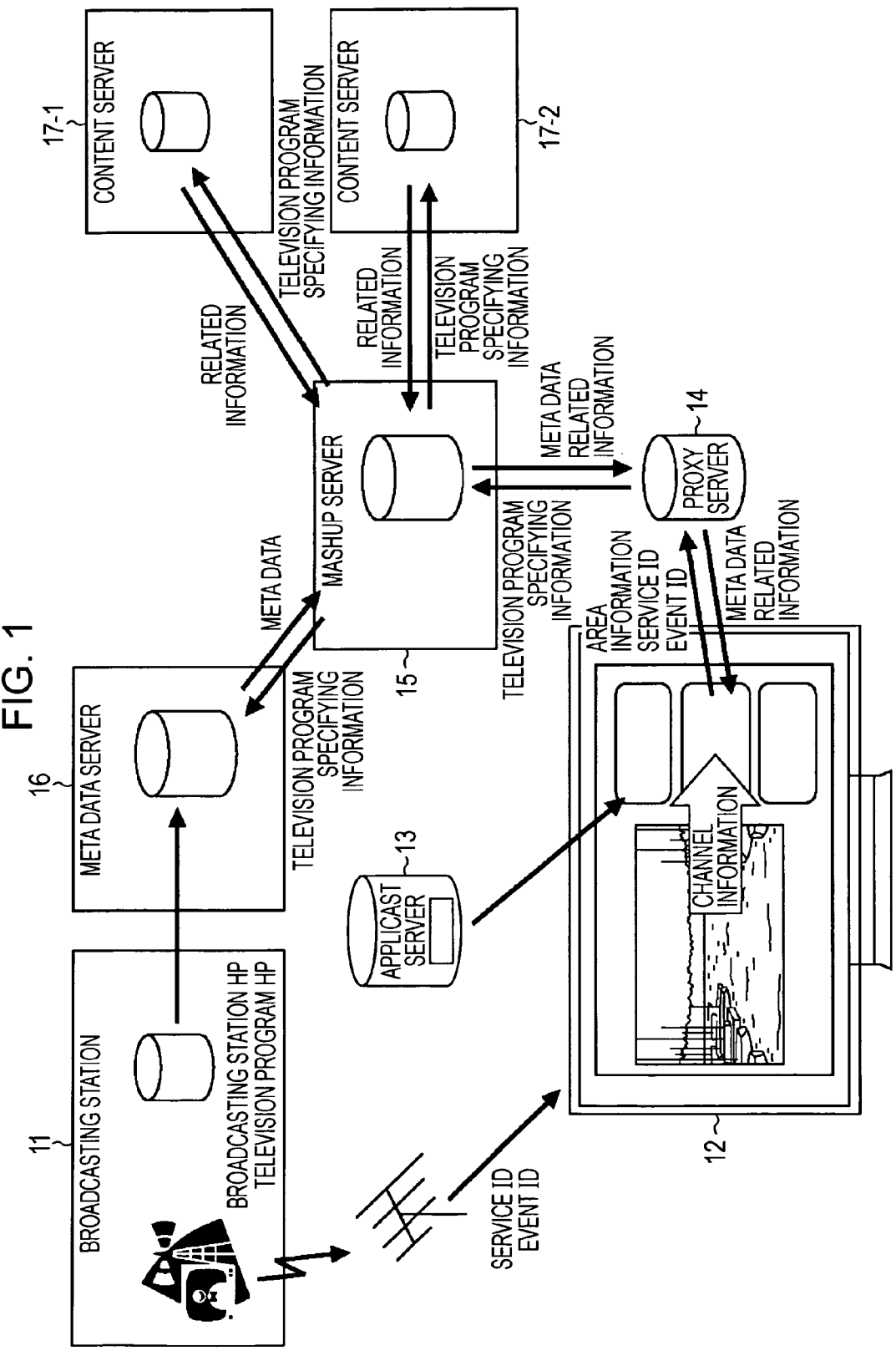
FIG. 1 illustrates an exemplary configuration of a related information acquisition system to which the invention is applied.

Referring now to the drawings, an embodiment to which the invention is applied will be described.

FIG. 1 illustrates an exemplary configuration of a related information acquisition system to which the invention is applied.

The related information acquisition system includes a broadcasting station 11, a display device 12, an applicast server 13, a proxy server 14, a mashup server 15, a meta data server 16 and content servers 17-1 and 17-2.

The broadcasting station 11 manages television programs broadcast by broadcasting companies and records data such as video data and SI of the television program and image data for displaying web pages of the television program or the broadcasting companies. The broadcasting station 11 also wirelessly broadcasts the SI of the television program along with the video data of the television program produced by, for example, a content provider.

The SI includes information about the television program being broadcast, such as service identification (ID) information for specifying broadcast channels, event ID information for specifying television programs, and information about performers in television programs. That is, the SI is information (i.e., specifying information) for specifying television programs between broadcasting companies (i.e., between sources of television programs).

The display device 12 may, for example, be a television receiver, which receives and displays video data and the SI of the television program broadcast by the broadcasting station 11. An applicast server 13 is connected to the display device 12 via a communication network, such as the Internet.

The applicast server 13 records, for example, programs which allow the display device 12 to acquire information, such as information related to a television program being broadcast, weather information and information on fortune telling via a communication network, and provides the display device 12 with these programs upon request from the display device 12.

The related information about a television program may include information related to the television program being broadcast by the broadcasting station 11, such as information about other television programs or DVDs related to the same performer and information about articles in commercials the same performer is performing in.

The display device 12 executes programs obtained from the applicast server via a communication network to obtain and display information related to the television program and various kinds of information including weather information via a communication network, such as the Internet.

In order to acquire television program-related information, the display device 12 executes a program obtained from the applicast server 13, and extracts the service ID and the event ID from the SI broadcast (i.e., transmitted) by the broadcasting station 11. The display device 12 then supplies the extracted service ID and event ID and area information recorded on the display device 12 to the proxy server 14 connected via a communication network, such as the Internet, and requests retrieval of the related information.

The area information represents the area in which the display device 12 is provided, which is input by the owner of the display device 12. A television program broadcast by the broadcasting station 11 is uniquely specified by the service ID, the event ID and the area information.

The proxy server 14, upon request for retrieval of related information from the display device 12, converts the service ID, the event ID and the area information supplied from the display device 12 into program specifying information for uniquely specifying the television program between the sources of the related information about the television program.

Here, the sources of the related information are the content servers 17-1 and 17-2. The content servers 17-1 and 17-2 record related information about television programs broadcast by the broadcasting station 11. Hereinafter, the content servers 17-1 and 17-2 will be collectively referred to as a "content server 17" unless it is necessary for them to be distinguished from each other.

The meta data server 16 records meta data of the television programs broadcast by the broadcasting station 11. The meta data may, for example, include a title, performers and a brief overview of a television program. The meta data may, for example, be supplied to the meta data server 16 from the broadcasting station 11 via a communication network, such as the Internet.

The proxy server 14, upon request for retrieval of related information from the display device 12, converts the service ID, the event ID and the area information into the program specifying information when it receives a request for retrieval of related information from the display device 12. The proxy server 14 then supplies the program specifying information obtained through the conversion to the mashup server 15 via a communication network, such as the Internet so as to request retrieval of the related information.

The mashup server 15, upon request for retrieval of the related information from the proxy server 14, supplies the program specifying information from the proxy server 14 to the content server 17 connected thereto via a communication network, and requests the related information.

The content server 17 retrieves the related information about the television program specified by the program specifying information out of the recorded related information based on the program specifying information supplied from the mashup server 15.

In the content server 17, for example, the program specifying information is correlated with information about the television program specified by the program specifying information, such as television program content information including a title and performers of the television program. The content server 17 retrieves the related information about the television program specified by the program specifying information out of the recorded related information by using key information. The key information may, for example, be information about the performers of the television program, included in the television program content information correlated with the program specifying information provided by the mashup server 15. In this case, related information including performers' names, as key information, is obtained as a result of retrieval.

The television program-related information may be correlated in advance with the program specifying information. In such a case, the related information correlated with the program specifying information provided by the mashup server 15, i.e., the related information specified by the program specifying information, will be obtained by the content server 17 as a result of retrieval.

The content server 17 retrieves the related information according to the request from the mashup server 15 and then supplies the retrieved related information to the mashup server 15.

The mashup server 15, upon request for retrieval of the related information from the proxy server 14, requests the related information from the content server 17 and, at the same time, requests the meta data from the meta data server 16. That is, the mashup server 15 supplies the program specifying information provided by the proxy server 14 to the meta data server 16 connected thereto via a communication network, and requests the meta data on the television program specified by the program specifying information and the meta data on other television programs related to that television program.

The meta data server 16 retrieves the meta data of other television programs related to the television program specified by the program specifying information using the meta data on the television program specified by the program specifying information provided by the mashup server 15 by using key information. The key information may, for example, be information about the performers of the television program included in the meta data. For example, the meta data including the performers' names as the key information is obtained as the result of the retrieval.

The meta data server 16 supplies the mashup server 15 with the meta data on the television program specified by the program specifying information provided by the mashup server 15 and the meta data on other television programs related to the television program specified by the program specifying information obtained by the retrieval using the meta data.

The mashup server 15 supplies the proxy server 14 with the thus-obtained related information from the content server 17 and the meta data obtained from the meta data server 16.

The mashup server 15, the meta data server 16 and the content server 17 are managed by, for example, a content provider which provides the content related to the television program broadcast by the broadcasting station 11 and to the television program.

When the related information and the meta data are supplied from the mashup server 15 in response to a request for retrieval of the related information from the mashup server 15, the proxy server 14 provides the display device 12 with the supplied related information and the meta data. The display device 12 can then display the related information and the meta data supplied from the proxy server 14.

When the display device 12 displays a television program received from the broadcasting station 11, i.e., when a viewer is watching the television program, the viewer may operate the display device 12 and request acquisition of the related information about the television program he or she is watching. Then the related information and the meta data as described above are obtained and displayed by the display device 12. That is, the related information and the meta data on the television program the viewer is watching are displayed.

In the related information acquisition system, as described above, the SI for specifying the television programs between the sources of the television programs is converted into the program specifying information for specifying the television programs between the source of the related information, and the related information and the meta data are retrieved and acquired based on the program specifying information. In particular, the sources (e.g., content providers) of the related information and the meta data may be the mashup server 15, the meta data server 16 and the content server 17.

In this manner, the television program-related information can be acquired using, as an origin (i.e., a mediator), the program specifying information which is virtual SI, i.e., the program specifying information corresponding to the SI, without directly using the SI of the television program the viewer is watching.

As shown in FIG. 1, the display device 12, the applicast server 13, the proxy server 14, the mashup server 15 and the meta data server 16 are mutually connected via a communication network, such as the Internet, and the data and information are transmitted and received among those components via the communication network. The meta data server 16 and the broadcasting station 11 are also connected to each other via a communication network, such as the Internet, and data such as the meta data is transmitted and received via the communication network. The broadcasting station 11 wirelessly broadcasts the video data and the SI of the television program by, for example, the ground digital broadcasting wave.

Figure 2:
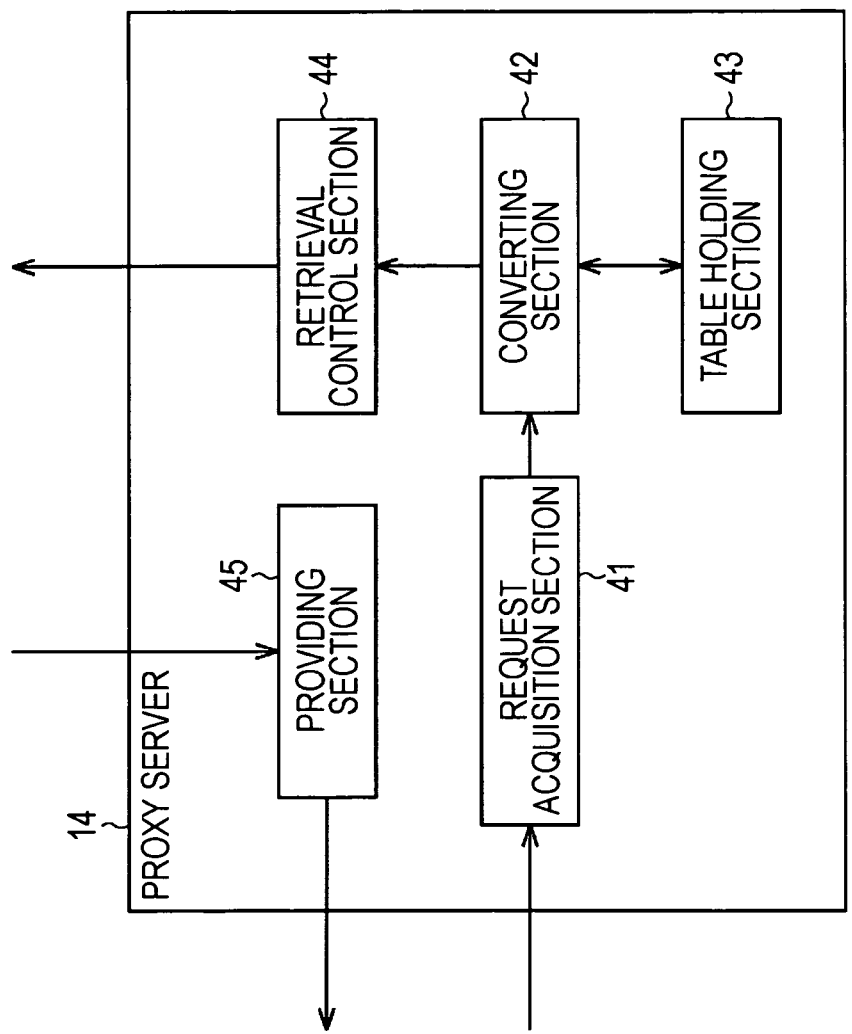
FIG. 2 is a block diagram showing an exemplary configuration of a proxy server.

FIG. 2 is a block diagram showing an exemplary configuration of the proxy server 14 of FIG. 1.

The proxy server 14 includes a request acquisition section 41, a converting section 42, a table holding section 43, a retrieval control section 44 and a providing section 45.

The request acquisition section 41 receives the service ID, the event ID and the area information of the television program together with a request for retrieval of the related information from the display device 12 via the communication network, and supplies them to the converting section 42. The converting section 42 refers to a table stored in the table holding section 43 and converts the service ID, the event ID and the area information supplied from the request acquisition section 41 into television program specifying information.

The table holding section 43 thus holds a table in which the service ID, the event ID and the area information are correlated with the program specifying information that represents the television program specified uniquely by the service ID, the event ID and the area information. The converting section 42 converts the service ID, the event ID and the area information supplied from the request acquisition section 41 into television program specifying information by acquiring the program specifying information correlated with the service ID, the event ID and the area information supplied from the request acquisition section 41 from the table in the table holding section 43. The converting section 42 supplies the retrieval control section 44 with the program specifying information obtained through the conversion.

The retrieval control section 44 supplies the mashup server 15 with the program specifying information supplied from the converting section 42 via the communication network, and requests retrieval of the related information. That is, the retrieval control section 44 controls the retrieval of the related information based on the program specifying information. Accordingly, the related information and the meta data obtained via the communication network as a result of retrieval are transmitted from the mashup server 15.

The providing section 45 receives the related information and the meta data transmitted from the mashup server 15 and provides the display device 12 with the received related information and the meta data via the communication network.

The display device 12 receives the video data of the television program and the SI of the television program broadcast by the broadcasting station 11 and displays the television program based on the received video data. If a viewer operates the display device 12 while watching the television program in order to request acquisition of the related information about the television program, the display device 12 obtains a program for acquiring the related information from the applicast server upon request and executes a program for obtaining the related information.

That is, the display device 12 extracts the service ID and the event ID from the SI of the television program the viewer is watching (i.e., being displayed) received from the broadcasting station 11 and supplies the proxy server 14 with the extracted service ID, the event ID and recorded area information to request the retrieval of the related information.

Figure 3:
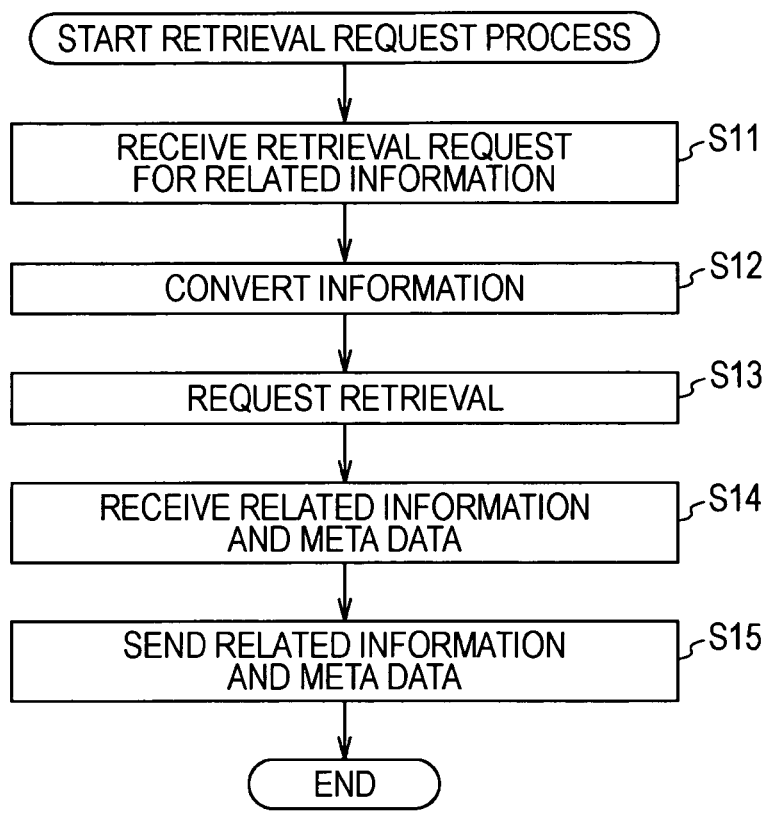
FIG. 3 is a flowchart illustrating a retrieval request process.

The proxy server 14, upon request from the display device 12, starts a retrieval request process in which the related information is acquired via a communication network and provided to the display device 12. Hereinafter, the retrieval request process by the proxy server 14 will be described with reference to the flowchart of FIG. 3.

In step S11, the request acquisition section 41 receives a retrieval request of the related information along with the service ID, the event ID and the area information from the display device 12, and supplies them to the converting section 42.

In step S12, the converting section 42 refers to a table in the table holding section 43 in response to the retrieval request provided by the request acquisition section 41 and converts the service ID, the event ID and the area information obtained from the request acquisition section 41 into the program specifying information which represents the television program specified by the acquired information. Then, the converting section 42 supplies the retrieval control section 44 with the program specifying information obtained through the conversion.

In step S13, the retrieval control section 44 transmits the program specifying information supplied from the converting section 42 to the mashup server 15 via the communication network and requests retrieval of the related information.

When the transmitted program specifying information is received by the mashup server 15, the mashup server 15 transmits the received program specifying information to the content server 17 and requests transmission of the related information. The mashup server 15 also transmits the received program specifying information to the meta data server 16 and requests transmission of the meta data.

Then, the content server 17 receives the program specifying information from the mashup server 15, retrieves the related information using the program specifying information and transmits the obtained related information to the mashup server 15. The meta data server 16 receives the program specifying information from the mashup server 15, retrieves the meta data using the program specifying information and transmits the obtained meta data to the mashup server 15.

The mashup server 15 receives the related information transmitted from the content server 17 and receives the meta data transmitted from the meta data server 16. The mashup server 15 then transmits the received related information and the meta data to the proxy server 14.

In step S14, the providing section 45 receives the related information and the meta data transmitted from the mashup server 15 as a result of retrieval of the related information.

In step S15, the providing section 45 transmits the related information and the meta data received from the mashup server 15 to the display device 12 as a result of retrieval of the related information requested by the display device 12 and completes the retrieval request process.

In this manner, the display device 12 which received the related information and the meta data from the proxy server 14 displays the related information and the meta data, and presents, to the viewer, the related information about the television program the viewer is watching (i.e., being displayed). Accordingly, the viewer may acquire television program-related information easily while watching the television program.

As described above, the proxy server 14 converts the service ID, the event ID and the area information acquired from the display device 12, which are information allowing the sources of the television programs to specify the television programs, into the program specifying information, which allows the sources of the related information and the meta data to specify the television program. The proxy server 14 then acquires the related information and the meta data related to the television program requested by the viewer using the program specifying information obtained through the conversion.

As described above, by converting the service ID, the event ID and the area information into the program specifying information, the related information and the meta data about the television program the viewer is watching may be obtained using the program specifying information obtained through the conversion without directly using the SI.

Although the related information and the meta data of the television broadcast program are acquired in the foregoing description, the invention is not limited thereto. The related information and the meta data of the content may alternatively be distributed via a communication network, such as the Internet.

A series of processes described above may also be implemented either by the hardware or by the software. If the series of processes is to be executed by the software, a program constituting the software may be installed from a program recording medium to a computer incorporated in a dedicated hardware, or a general-purpose personal computer which can execute various functions with various programs installed therein.

FIG. 4 is a block diagram showing an exemplary configuration of the computer hardware which executes a series of processes described above according to a program.

In the computer, a central processing unit (CPU) 201, a read only memory (ROM) 202 and a random access memory (RAM) 203 are mutually connected by a bus 204.

An I/O interface 205 is further connected to the bus 204. An input section 206, an output section 207, a recording section 208, a communicating section 209 and a drive 210 are connected to the I/O interface 205. The input section 206 may include a keyboard, a mouse and a microphone. The output section 207 may include a display and a speaker. The recording section 208 may include a hard disk and a nonvolatile memory. The communicating section 209 may include a network interface. The drive 210 drives a removable medium 211, such as a magnetic disc, an optical disc, a magneto-optical disc and a semiconductor memory.

In the thus-configured computer, the series of processes described above is executed when, for example, the CPU 201 causes a program recorded on the recording section 208 to be loaded on the RAM 203 for execution via the I/O interface 205 and the bus 204.

The program to be executed by the computer (i.e., the CPU 201) may be recorded on a removable medium 211, which is a package medium including a magnetic disc (including a flexible disc), an optical disc (e.g., a compact disc-read only memory (CD-ROM), a digital versatile disc (DVD), a magneto-optical disc or a semiconductor memory) or may be provided via a wired or wireless transmission medium, such as a local area network, the Internet, and digital satellite broadcasting.

The program may be installed in the recording section 208 via the I/O interface 205 when a removable medium 211 is placed in the drive 210. The program may be received by the communicating section 209 via a wired or wireless transmission medium and installed in the recording section 208. The program may alternatively be installed in advance in the ROM 202 or in the recording section 208.

The program to be executed by the computer may be a time-series program in which processes are executed in the described order or may be a program in which processes are executed in parallel or upon request, e.g., when invoked.

It is to be understood that the foregoing description of the embodiment of the invention is illustrative only and that various modification may be made without departing from the sprit and scope of the invention.

What is claimed is:

1. An information processing unit comprising:
    a receiving means for receiving, via a communication network, first specifying information from a display device which receives and displays content being broadcast, the first specifying information being used by a source of content to specify the content, in which the content refers to a television program;
    a converting means for converting, upon request for retrieval of related information from the display device, the first specifying information into second specifying information, the second specifying information being used by a source of the related information to specify the television program and the related information being related to the television program;
    a retrieval controlling means for transmitting the second specifying information to a retrieval device via the communication network and for requesting retrieval of the related information and meta data based on the second specifying information, said meta data pertaining to (i) the television program specified by the second specifying information and (ii) another television program related thereto; and a providing means for providing the display device with the meta data and the related information acquired from the retrieval device via the communication network in response to the request for retrieval of the related information and the meta data to the retrieval device, in which the first specifying information includes service identification (ID) information, event identification (ID) information and area information, in which the service ID information specifies a broadcast channel or channels, the event ID information specifies a program or programs, and the area information represents an area wherein the display device is provided, and in which the related information is acquired without directly using the SI, wherein the first specifying information is generated by the display device executing a program the display device acquires from an applicast server when a viewer requests acquisition of the related information through operation of the display device, the display device generating the first specifying information by extracting the service ID and the event ID from the service information (SI) of a television program currently displayed on the display device, wherein the information processing unit comprises a proxy server, the converting means comprises a table holding section and refers to a table in the table holding section to convert the service ID, event ID and area information into television program specifying information, wherein the proxy server transmits the television program specifying information to a mashup server which receives the meta data from a meta data server and receives the related information from one or more content servers which are external to the meta data server, and wherein the proxy server receives the meta data and related information from the mashup server.

2. The information processing unit according to claim 1, in which the area information is input by a user.

3. An information processing unit comprising:

a receiving unit which receives, via a communication network, first specifying information from a display device which receives and displays content being broadcast, the first specifying information being used by a source of content to specify the content, in which the content refers to a television program;

a converting unit which, upon request for retrieval of related information from the display device, converts the first specifying information into second specifying information, the second specifying information being used by a source of the related information to specify the television program and the related information being related to the television program;

a retrieval controlling unit which transmits the second specifying information to a retrieval device via the communication network and requests retrieval of the related information and meta data based on the second specifying information, said meta data pertaining to (i) the television program specified by the second specifying information and (ii) another television program related thereto; and a providing unit which provides the display device with the meta data and the related information acquired from the retrieval device via the communication network in response to the request for retrieval of the related information and the meta data to the retrieval device, in which the first specifying information includes service identification (ID) information, event identification (ID) information and area information, in which the service ID information specifies a broadcast channel or channels, the event ID information specifies a program or programs, and the area information represents an area wherein the display device is provided, and in which the related information is acquired without directly using the SI, wherein the first specifying information is generated by the display device executing a program the display device acquires from an applicast server when a viewer requests acquisition of the related information through operation of the display device, the display device generating the first specifying information by extracting the service ID and the event ID from the service information (SI) of a television program currently displayed on the display device, wherein the information processing unit comprises a proxy server, the converting unit comprises a table holding section and refers to a table in the table holding section to convert the service ID, event ID and area information into television program specifying information, wherein the proxy server transmits the television program specifying information to a mashup server which receives the meta data from a meta data server and receives the related information from one or more content servers which are external to the meta data server, and wherein the proxy server receives the meta data and related information from the mashup server.

4. The information processing unit according to claim 3, in which the area information is input by a user.

* * * * *